United States Patent
Walley et al.

(10) Patent No.: US 12,323,072 B2
(45) Date of Patent: Jun. 3, 2025

(54) RECTIFIER STABILITY ENHANCEMENT USING CLOSED LOOP CONTROL

(71) Applicant: Avago Technologies International Sales Pte. Limited, Singapore (SG)

(72) Inventors: John Walley, Ladera Ranch, CA (US); Jim Le, Fort Collins, CO (US); Marc Keppler, Windsor, CO (US)

(73) Assignee: AVAGO TECHNOLOGIES INTERNATIONAL SALES PTE. LIMITED, Palo Alto, CA (US)

( * ) Notice: Subject to any disclaimer, the term of this patent is extended or adjusted under 35 U.S.C. 154(b) by 39 days.

(21) Appl. No.: 17/877,462

(22) Filed: Jul. 29, 2022

(65) Prior Publication Data

US 2024/0039423 A1 Feb. 1, 2024

(51) Int. Cl.
*H02M 7/217* (2006.01)
*H02J 50/10* (2016.01)
*H02J 50/70* (2016.01)
*H04L 27/02* (2006.01)

(52) U.S. Cl.
CPC ............ *H02M 7/217* (2013.01); *H02J 50/10* (2016.02); *H02J 50/70* (2016.02); *H04L 27/02* (2013.01)

(58) Field of Classification Search
CPC .......... H02M 7/217; H02J 50/10; H02J 50/70; H04L 27/02
USPC ...................................................... 307/104
See application file for complete search history.

(56) References Cited

U.S. PATENT DOCUMENTS

| | | | |
|---|---|---|---|
| 9,071,161 B2 * | 6/2015 | Lin | H02M 1/4258 |
| 9,825,553 B2 | 11/2017 | Celani | |
| 9,904,306 B2 | 2/2018 | Yeon et al. | |
| 10,069,338 B2 | 9/2018 | He et al. | |
| 10,177,602 B2 * | 1/2019 | Akram | H01F 38/14 |
| 10,340,786 B2 | 7/2019 | Zhao et al. | |
| 10,381,877 B2 | 8/2019 | Su | |
| 10,630,109 B2 | 4/2020 | Smith et al. | |
| 11,165,364 B2 | 11/2021 | Zhan et al. | |
| 11,309,716 B2 | 4/2022 | Li et al. | |
| 2003/0227280 A1 * | 12/2003 | Vinciarelli | H02M 7/003 323/265 |
| 2014/0247141 A1 * | 9/2014 | Proud | H02J 50/10 340/870.02 |

(Continued)

FOREIGN PATENT DOCUMENTS

EP 3258581 B1 1/2019

*Primary Examiner* — Alfonso Perez Borroto
(74) *Attorney, Agent, or Firm* — Quarles & Brady LLP

(57) ABSTRACT

A system and method for monitoring signal quality metrics coupled with closed-loop control improves rectifier signal quality and stability. The closed-loop control passes the metric through a high-pass filter and captures error values. This signal is then passed to a controller to adjust rectifier settings. The measured signal, where signal quality is derived could be $V_{RECT}$, $F_{CLK}$, network coil measurements, is used for ASK demodulation, or the like. The controller identifies noise levels and noise types in real-time, and sets parameters of the rectifier to preserve system stability. The controller may set baud rates and preamble thresholds in a wireless power transfer system in response to identified noise levels and types.

17 Claims, 9 Drawing Sheets

(56) References Cited

U.S. PATENT DOCUMENTS

| | | | |
|---|---|---|---|
| 2014/0340039 A1* | 11/2014 | Lee | B60L 53/22 |
| | | | 320/109 |
| 2015/0162842 A1* | 6/2015 | Lin | H02M 1/4258 |
| | | | 363/21.02 |
| 2015/0364928 A1* | 12/2015 | Yen | H02M 3/07 |
| | | | 320/108 |
| 2016/0268834 A1* | 9/2016 | Satyamoorthy | H02J 50/10 |
| 2016/0303984 A1* | 10/2016 | Lee | B60L 53/22 |
| 2017/0063154 A1* | 3/2017 | Minami | H02J 50/80 |
| 2017/0098962 A1* | 4/2017 | Desrosiers | H02M 3/33592 |
| 2018/0076635 A1* | 3/2018 | Maalouf | H02J 7/02 |
| 2019/0131815 A1* | 5/2019 | Liu | H02J 7/0071 |
| 2020/0280216 A1 | 9/2020 | Pei et al. | |

* cited by examiner

RECTIFIER STABILITY ENHANCEMENT USING CLOSED LOOP CONTROL

BACKGROUND

Existing wireless power transfer systems are generally configured according to a set of parameters with little or no capability for dynamic adjustment. As wireless power transfer is implemented to support a wider set of operating conditions (e.g., power levels, frequency, enhanced modes, and the like), the potential for interference and system instability increases. In some instances, a rectifier can be placed into a mode that makes the overall system less stable. Having the ability to monitor the stability of the rectifier is, therefore, highly advantageous.

The stability of the rectified voltage ($V_{RECT}$) in a wireless power transfer system impacts various aspects of overall system quality and stability. When the rectifier becomes unstable, $V_{RECT}$ exhibits ripples/oscillations. Oscillations compromise communications and efficiency. Existing solutions to rectifier stability require a coil network with a narrow operating range and very fast comparators.

It is sometimes desirable to change rectifier modes based on metrics such as $V_{RECT}$, noise level, other noise characteristics, and the like. A controller may change modem behavior based on noise characteristics. Systems may include separate modems for frequency shift keying (FSK) and amplitude shift keying (ASK), and a controller may determine which modem to use based on noise characteristics. It is therefore useful to accurately measure and characterize noise. Characterization of noise defines a metric for decision making by the controller.

It would be advantageous to have a rectifier that monitors signal quality and uses that information to change system settings to enhance system performance.

SUMMARY

In one aspect, embodiments of the inventive concepts disclosed herein are directed to a system and method for monitoring $V_{RECT}$ coupled with closed-loop control to improve rectifier signal quality and stability. The closed-loop control passes $V_{RECT}$ through a high-pass filter and captures error values. The error values are then passed to a controller to adjust current for closed-loop $V_{RECT}$ control.

In a further aspect, the controller monitors various aspects of rectifier signal quality, including $V_{RECT}$ fidelity, carrier frequency oscillating signal ($F_{CLK}$) fidelity, and coil or series capacitance fidelity (e.g., used for amplitude shift keying (ASK) demodulation)). The controller identifies noise levels and noise types in real-time, and sets parameters of the rectifier to preserve system stability.

In a further aspect, the controller may set baud rates and preamble thresholds in a wireless power transfer system in response to identified noise levels and types.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
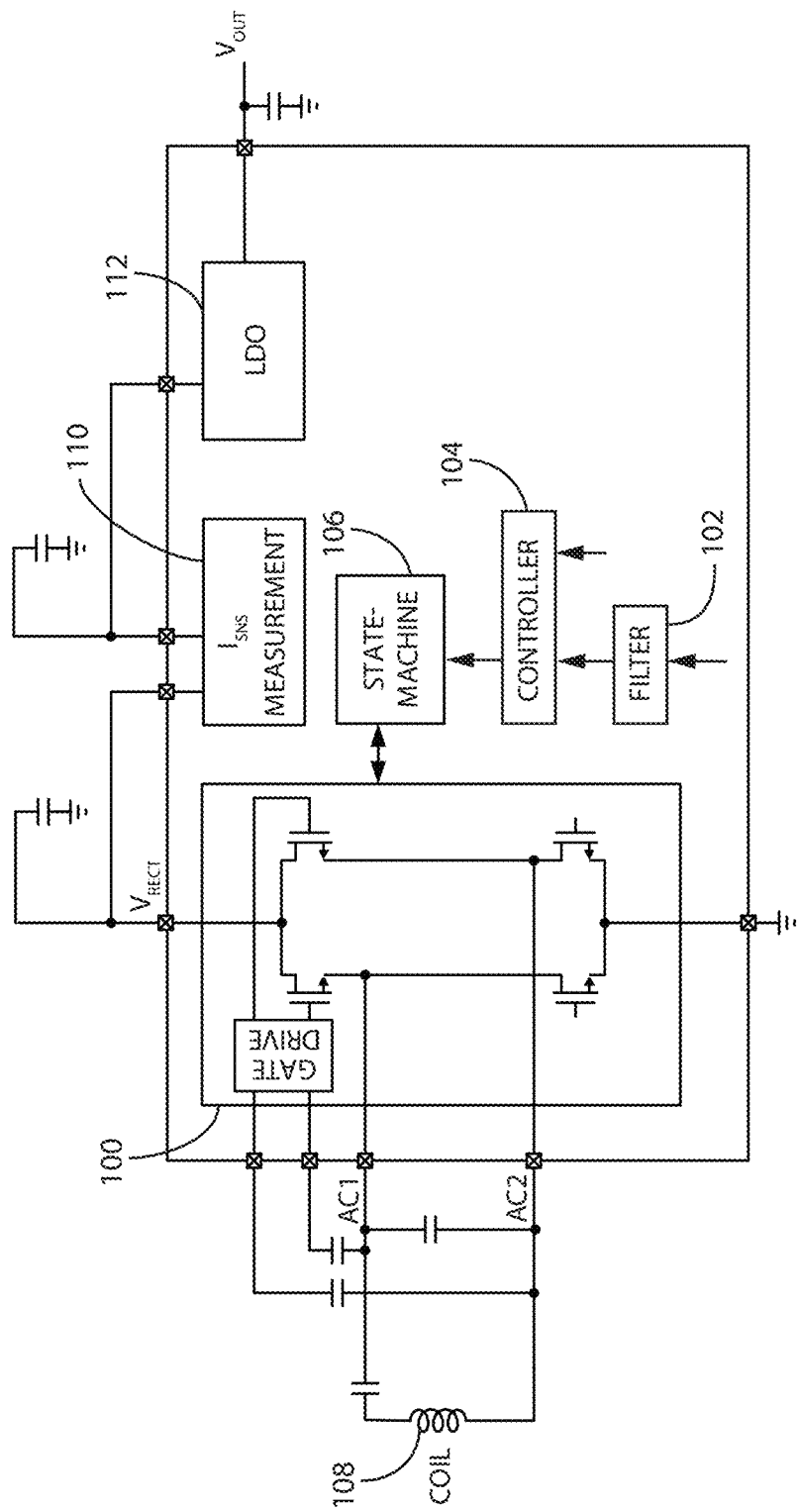
FIG. 1 shows a block diagram of a system according to an exemplary embodiment.

Before explaining various embodiments of the inventive concepts disclosed herein in detail, it is to be understood that the inventive concepts are not limited in their application to the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of a feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement. Components may be in data communication with intervening components that are not illustrated or described.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in at least one embodiment" in the specification does not necessarily refer to the same embodiment. Embodiments of the inventive concepts disclosed may include one or more of the features expressly described or inherently present herein, or any combination or sub-combination of two or more such features.

Broadly, embodiments of the inventive concepts disclosed herein are directed to a system and method for monitoring a measured signal quality metric coupled with closed-loop control to improve rectifier signal quality and stability. A rectifier may be any device that converts alternating current (AC) to direct current (DC). The rectifier may be, but is not limited to, an uncontrolled rectifier or a controlled rectifier. The closed-loop control may pass the metric through a high-pass filter and captures error values. A filter may be any device that allows certain frequencies to pass while blocking others (e.g., a high-pass filter or a low-pass filter). For example, a high-pass filter may allow frequencies above a certain frequency to pass, while blocking frequencies below the cutoff frequency. This signal may then be passed to a controller to adjust rectifier settings for closed-loop control. The measured signal (e.g., where signal quality is derived from $V_{RECT}$, $F_{CLK}$, network coil measurements, and the like) may be used for ASK demodulation, or the like. The controller may identify noise levels and noise types in real-time, and sets parameters of the rectifier to preserve system stability. The controller may set baud rates and preamble thresholds in a wireless power transfer system in response to identified noise levels and types.

Referring to FIG. 1, a block diagram of a system according to an exemplary embodiment is shown. The system, such as a wireless power transfer system, may include a rectifier 100 that receives phase offset alternating current (AC) signals and outputs $V_{RECT}$, a direct current (DC) voltage. The rectifier 100 may include a plurality of field effect transistors (FETs) that are switched via gate drive circuitry or logic. An FET may be any type of transistor that uses an electrical field to control the flow of current in a semiconductor. The field effect transistor may be, but is not limited to, a junction field effect transistor (JFET) or an insulated-gate field effect transistor (IGFET). For example, each FET may be switched via a corresponding current comparator configured to switch the corresponding FET in response to some rectifier turn-off threshold current ($I_{LIM}$); $I_{LIM}$ may be specific to each FET, specific to sets of low side FETs and high side FETs, or substantially identical for each FET, or the like. A comparator may be any device (e.g., a circuit or a component of a circuit) that has an input of two separate voltages or currents and has an output of a value based on which input is larger. For example, if a first input is larger than a second input the comparator may output a 1. Conversely, if a second input is larger than a first input, the comparator may output a 0. A comparator may include a high-gain differential amplifier. Further, the output of the comparator may act as a switch for components of a circuit (e.g., the FETs) by, for example, providing a gate voltage to FET or turning off the gate voltage to the FET.

Wireless power transfer systems, in addition to sending power from a transmitter to a receiver, may also establish data communication links via modems that send and receive data through the same electronic connection. A modem may be any device (e.g., a component of a circuit) that includes modulating and demodulating capabilities. For example, at one end of the modem, the modem may accept digital data and convert (e.g., modulate) the digital data to an analog signal. Conversely, at the other end of the modem, the analog signal may be unconverted (e.g., demodulated) and digital data may be output. The modem may be, but is not limited to, a half-duplex or a full-duplex modem. Existing standards in wireless power are onerous because any kind of communication error triggers a shut down and restart of the wireless power link. Whenever a packet is missed, the system stops charging completely, reverts to a startup procedure, and restarts the wireless power session.

$F_{CLK}$ fidelity may indicate a fault in the system. Sometimes an $F_{CLK}$ is noisy because an error in the coil network 108 causes excessive ringing or some other abnormality. A coil network may be any inductor, or multiple inductors, inserted into an electronic circuit to increase the inductance of the circuit. In at least one embodiment, the system may include a controller 104 (e.g., a programmable processor, gate array, or other logic circuitry) configured to receive $F_{CLK}$ and determine a fidelity value with respect to a separate oscillator. An oscillator may be any electronic circuit that produces a periodic and oscillating signal. The signal may be, but is not limited to, a sine wave, a square wave, or a triangle wave. An oscillator may be, but is not limited to a low-frequency oscillator, a radio frequency (RF oscillator), or a high-frequency oscillator. Alternatively, or in addition, $F_{CLK}$ fidelity may be measured by measuring the turn-on and turn-off times of components in the rectifier 100 (e.g., the FETs), with reference to a known clock. The controller 104, which may be configured as a proportional integral (PI) controller, may accumulate measurements periodically over some time intervals (e.g., clock cycles). In at least one embodiment, measurements could be every millisecond, every 10 milliseconds, or the like. While specific embodiments refer to a PI controller, it may be appreciated that other embodiments are envisioned; for example, the controller 104 may be configured as a proportional integral derivative (PID) controller. Furthermore, while specific embodiments refer to a single controller 104, multiple controllers 104 are envisioned that may operate separately or in conjunction to perform the functions described herein.

Alternatively, measurements may be asynchronous or event triggered. In at least one embodiment, the controller 104 may detect an event that causes an interruption. The controller 104 may then take a measurement of $F_{CLK}$ fidelity. In another example, during modem operations, there may be a known time window when an FSK message will be received and the controller 104 will negotiate a baud rate in anticipation of the FSK message. It would be advantageous to take a measurement of noise before that negotiation.

Any mode change in the rectifier 100 may be sensitive to network parameters. Whenever a mode change occurs, the controller 104 may measure signal quality and ensure the rectifier 100 is reacting properly; otherwise, the controller 104 may revert to a previous, known stable mode. For example, the rectifier 100 may be configured for a continuous conduction mode where the behavior of a state machine 106 (e.g., a sequential circuit (e.g., a circuit that operates based on a specific sequence of events)) in the rectifier 100 is programmed. If values programmed into registers in the state machine 106 do not match the frequency of the carrier signal, the rectifier 100 may become unstable. It would be advantageous to identify such conditions quickly. In such cases, the controller 104 may take a measurement of $F_{CLK}$ fidelity in response to entering a continuous conduction mode to verify rectifier stability. Where the controller 104 determines the rectifier is unstable, it may turn off the continuous conduction mode. A continuous conduction mode may be difficult to implement without a mechanism for monitoring signal quality such as described herein. Where the rectifier 100 is switching in and out of a continuous conduction mode, $F_{CLK}$ fidelity measurements may indicate a particular type of instability.

Rectifier stability may refer to the output of the rectifier 100. The voltage $V_{RECT}$ of the rectifier may not be strictly DC; it may include AC components and oscillations (e.g., noise). In at least one embodiment, $V_{RECT}$ may be processed via the controller 104. The controller 104 may include a slope detector (e.g., a high frequency detector). The slope detector may determine the slope or first derivative of $V_{RECT}$, which may be used to adjust boosting of the rectifier 100. In at least one embodiment, the controller 104 may measure noise on $V_{RECT}$ and feed the noise back into the rectifier 100 in a closed loop. Such closed loop feedback may function as an adaptive noise filter where the controller 104 measures an excursion of noise and feeds it back into the rectifier 100, thereby attenuating the noise.

In at least one embodiment, the controller 104 may make measurements of $F_{CLK}$ fidelity and perform the calculations as described herein in either the analog domain (e.g., with reference to an analog oscillator) or the digital domain (e.g., with reference to one or more digital timers). The controller 104 may perform post-processing such as, but not limited to, calculating a mean error, a root mean square error, and/or a variance.

In at least one embodiment, a wireless power transfer system may include a filter 102 (e.g., a high pass filter) configured to extract noise components (e.g., high frequency oscillations) of the $V_{RECT}$ signal. Alternatively, or in addition, the filter 102 may receive $F_{CLK}$ and/or coil network 108 measurements. The filtered noise components may be transferred to the controller 104 and a state machine 106 that may adjust current thresholds ($I_{LIM}$) in one or more comparators in the rectifier and/or boost the gain of the rectifier 100 based on the filtered noise components. $I_{LIM}$ adjustments may be limited to some predetermined range (e.g., +/−400 mA).

In at least one embodiment, the controller 104 monitoring $V_{RECT}$ may identify noise (e.g., ripple oscillations), and adjust $I_{LIM}$ of one or more comparators of the rectifier 100 to change the threshold at which the corresponding FETs turn on and off. For example, $V_{RECT}$ may be passed through a high pass filter 102 such as a 500 kHz filter. The controller 104 (e.g., a PI controller) may identify instantaneous, mean, and/or root mean square noise levels from high frequency components of $V_{RECT}$, then calculate an $I_{LIM}$ threshold as a function of the high frequency components. In at least one embodiment, the controller 104 may be configured according to machine learning algorithms to determine the $I_{LIM}$ threshold based on inputs including, but not limited to, the high frequency components of $V_{RECT}$. The controller 104 may then deliver the new $I_{LIM}$ threshold to the comparators, either directly or via the state machine 106. Previous mechanisms for adjusting $I_{LIM}$ via an open loop method demonstrated the potential for instability. By contrast, a closed loop controller-based mechanism may eliminate system oscillations.

In at least one embodiment, the controller 104 may receive signals to turn on and off measurement accumulation, reset integrated error values, dump an integrated error value after a predetermined amount of integration, and the like. The controller 104 may be separately controllable with respect to measurement of $F_{CLK}$ fidelity and $V_{RECT}$ fidelity.

In at least one embodiment, the controller 104 may receive output current measurements from an output current sensor ($I_{SNS}$) 110. Furthermore, the system may include a linear voltage regulator such as a low-dropout regulator (LDR) 112. An output current sensor may be any device that converts current to an output voltage. A low-dropout regulator may be any device that regulates the output voltage in a DC circuit.

Figure 2:
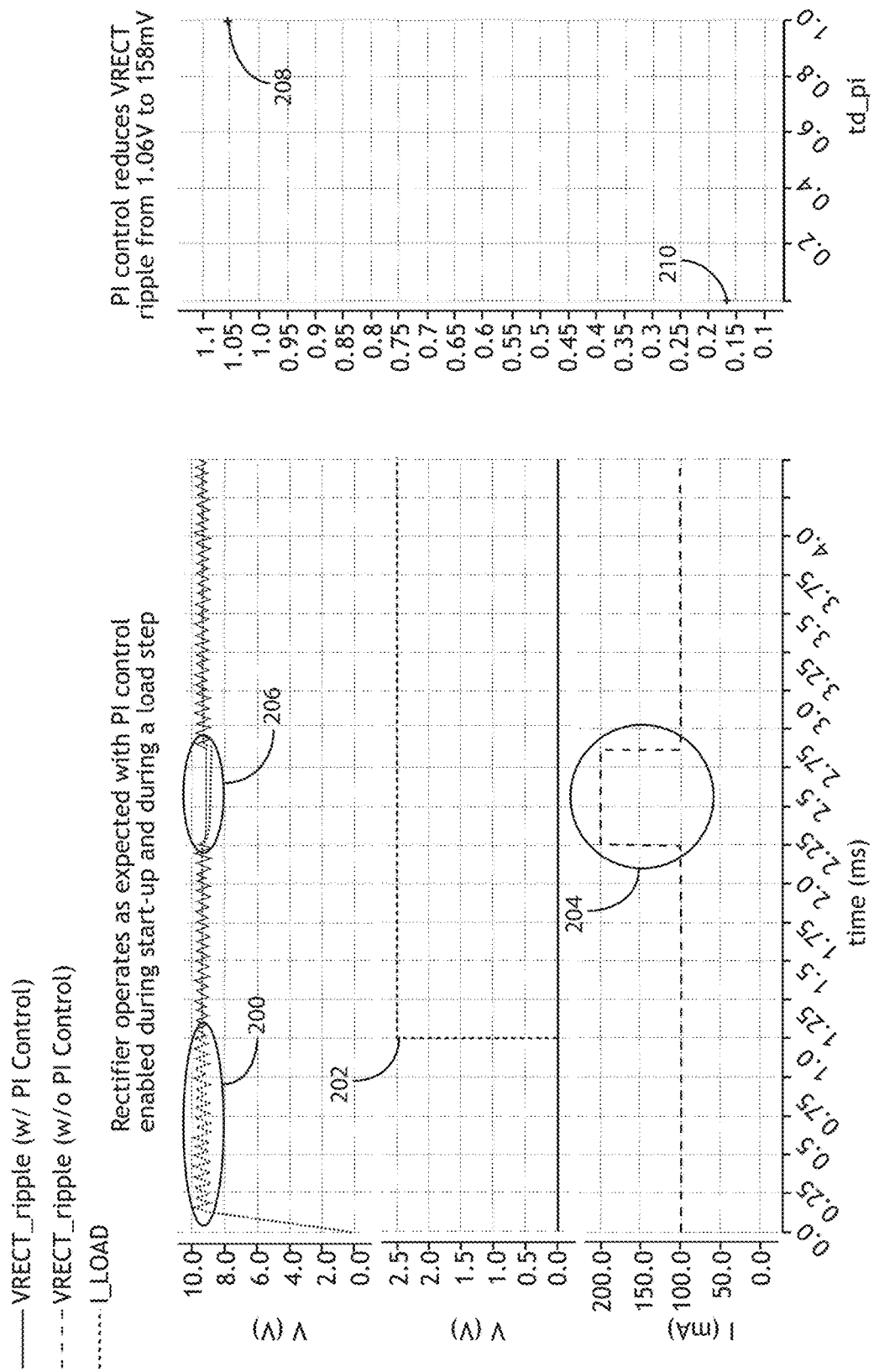
FIG. 2 shows graphs of rectifier output under various conditions.

Referring to FIG. 2, graphs of rectifier output under various conditions are shown. In one example simulation, coil parameters, comparator delays, and system input values may tend to produce oscillations 200. A load 204 may dampen oscillations 206, however a controller according to an exemplary embodiment may turn on 202, either at startup or at some later time, and keep oscillations 200 within a bound even when there is no load or minimal load. Without the controller, the ripple oscillation may be over a volt 208 on $V_{RECT}$ as compared to approximately 150 millivolts 210 with the controller; 50 to 150 millivolts of ripple is typical in a stable rectifier due to switching.

Figure 3:
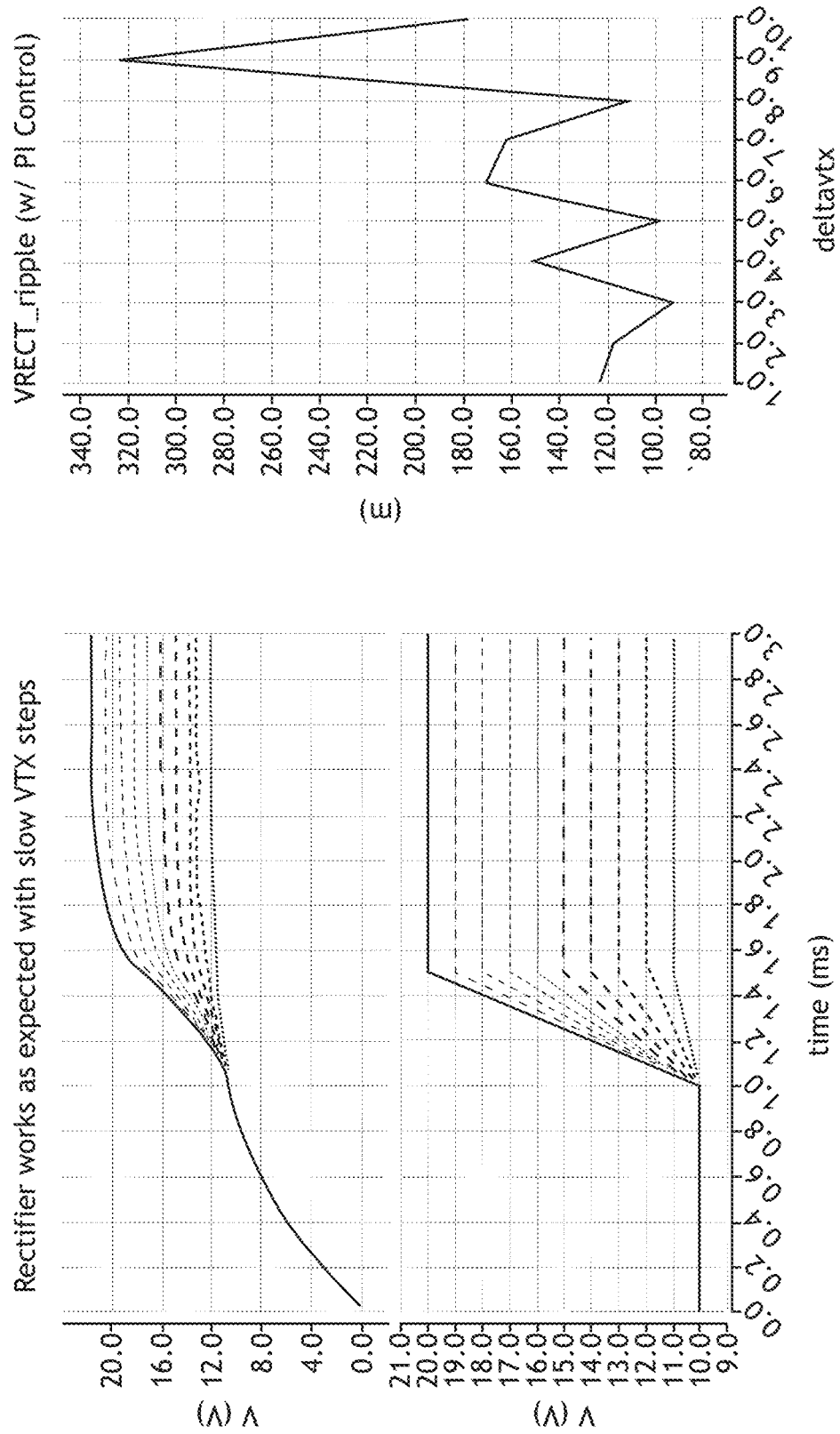
FIG. 3 shows graphs of rectifier output under various conditions.
Figure 4:
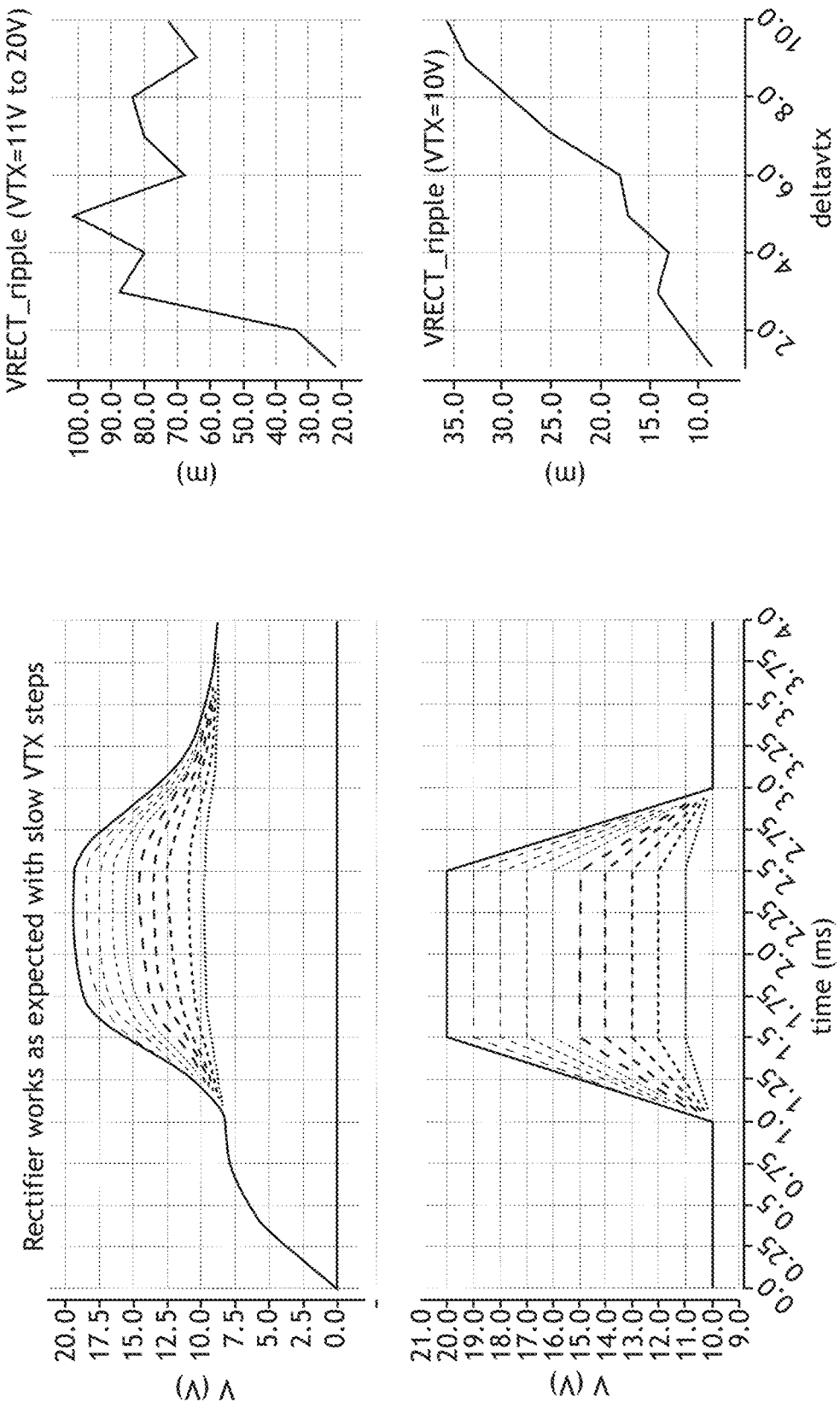
FIG. 4 shows graphs of rectifier output under various conditions.
Figure 5:
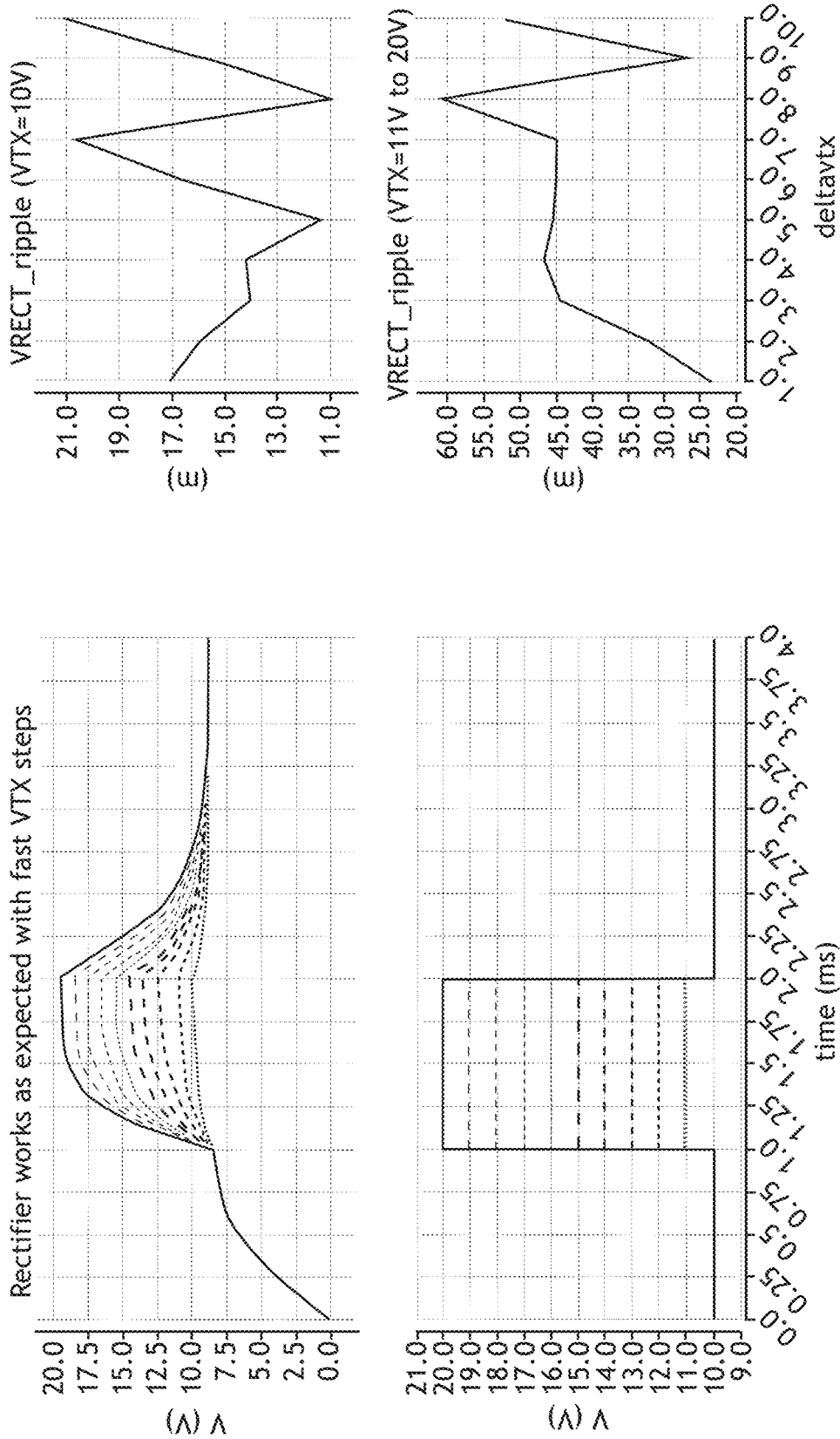
FIG. 5 shows graphs of rectifier output under various conditions.

Referring to FIGS. 3-5, graphs of rectifier output under various conditions are shown. Simulations demonstrate that in worst case stability conditions, with a controller enabled, ripple may be well controlled, according to an exemplary embodiment. Likewise, in typical conditions, utilizing a slow line step (e.g., as in FIGS. 3 and 4) or a fast line step (e.g., as in FIG. 5), ripple may be maintained within acceptable limits and no instability may be introduced by adjusting $I_{LIM}$.

Figure 6:
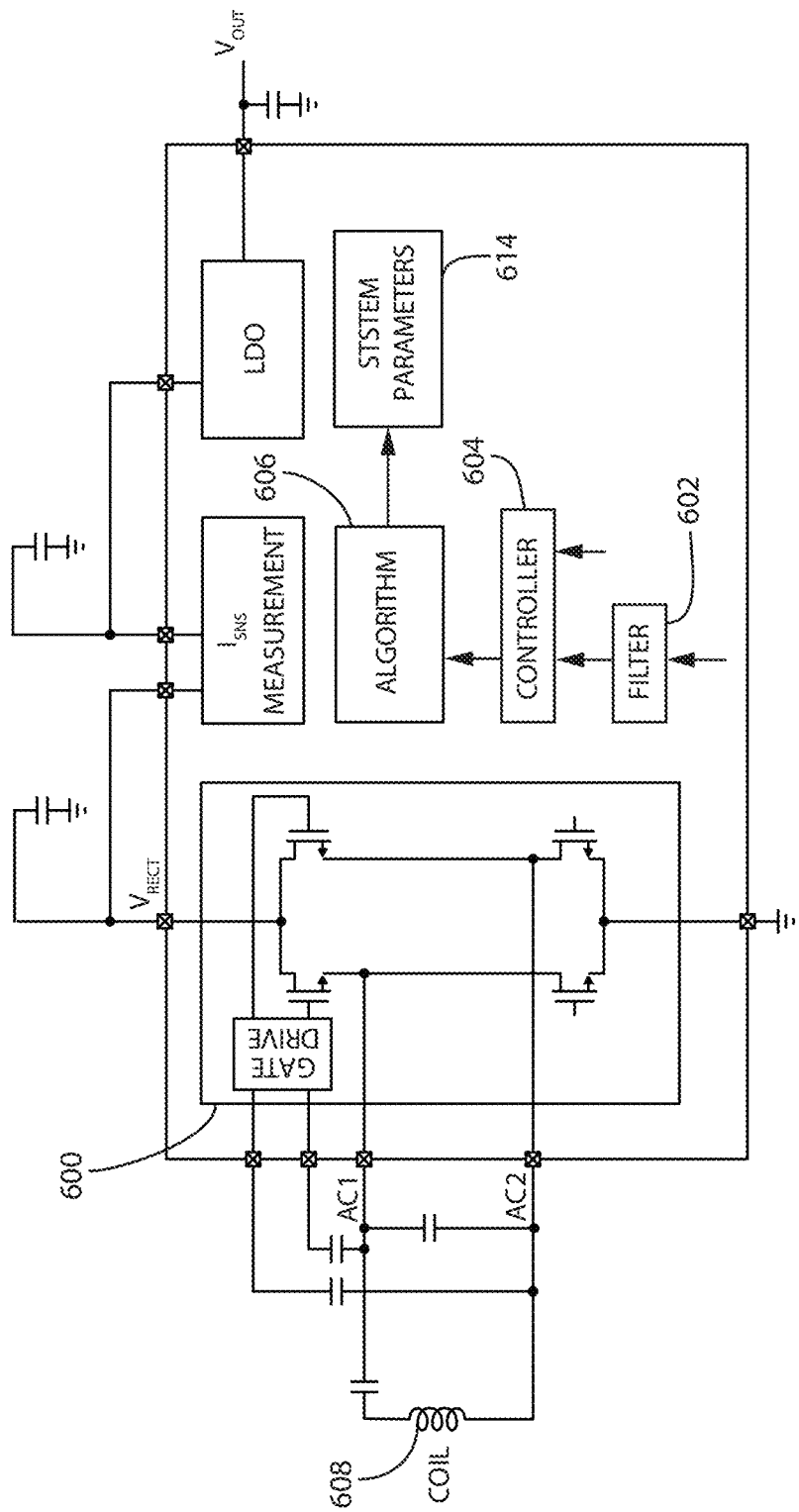
FIG. 6 shows a block diagram of a system according to an exemplary embodiment.

Referring to FIG. 6, a block diagram of a system according to an exemplary embodiment is shown. The system, such as a wireless power transfer system (for example, as described with respect to FIG. 1), may include a rectifier 600 that receives phase offset AC signals and outputs $V_{RECT}$. The rectifier 600 may include a plurality of FETs that may be switched via gate drive circuitry or logic such as current comparators configured to switch the corresponding FET based on $I_{LIM}$.

Wireless power transfer systems, in addition to sending power from a transmitter to a receiver, may also establish data communication links via modems that send and receive data through the same electronic connection. Whenever a rectifier receives a power signal, the rectifier may derive a clock, $F_{CLK}$, from that power signal, and may use that clock for FSK decoding, as an accurate clock reference for baud rates, clock error corrections, and the like. It may be desirable to derive an $F_{CLK}$ fidelity to determine if the noise on that clock allows the clock to be usable, what type of FSK front end filtering is needed, improved ASK/FSK modem thresholds based on noise, what type of modem to use, and the like.

Existing standards in wireless power are onerous because any kind of communication error triggers a shut down and restart of the wireless power link. Whenever a packet is missed, the system stops charging completely, reverts to a startup procedure, and restarts the wireless power session. In at least one embodiment, the system may, but is not limited to, set system parameters (e.g., ASK parameters (e.g., preamble thresholds or baud rates)), frequency bands, or use an out-of-band communication protocol (e.g., Bluetooth) according to one or more signal quality metrics to balance a desired communication rate with a low incidence of restart. Signal quality metrics may include, but are not limited to, $F_{CLK}$ fidelity, $V_{RECT}$ fidelity, and ASK modulation fidelity.

In at least one embodiment, a controller 604 (e.g., a programmable processor, gate array, or other logic circuitry) may be configured to receive $F_{CLK}$ and determine a fidelity value as described herein. Furthermore, a filter 602 (e.g., a high pass filter) may extract noise components (e.g., high frequency oscillations) of the $V_{RECT}$ signal.

$F_{CLK}$ fidelity may be particularly useful for determining a baud rate, for optimizing a front-end modem, performing a build-in self-test, or the like. In wireless power transfer systems, $F_{CLK}$ fidelity and $V_{RECT}$ fidelity may be useful for identifying when a system is beyond some specification boundary. $F_{CLK}$ fidelity values and $V_{RECT}$ fidelity values accumulated by the controller 604 may be delivered to an algorithm 606 configured to associate such fidelity values to system parameters 614. The algorithm 606 may comprise one or more lookup tables, mathematical function associations, a trained machine learning system, or the like. The algorithm 606 may then apply the identified set of desirable system parameters 614; including an in or out-of-channel communication protocol, ASK and FSK preamble thresholds, modem baud rate, and the like.

Existing wireless power transfer systems have a fixed baud rate for FSK. Embodiments of the present disclosure enable variable and fast baud rates. The controller 604 measuring signal quality metrics and corresponding algorithm 606 may determine an increased baud rate to apply to the system.

For ASK communication, the system may include a decoding modem that listens to the received power signal for a preamble. When preamble thresholds are set improperly, the system may determine that a packet is coming and prepare the modem and central processing unit (CPU), which wastes power. Furthermore, a false start may cause packet loss if the system starts a false preamble and then receives an actual preamble while looking for a packet. Alternatively, without proper thresholds, the system may completely miss packets, which is a particular problem in wireless power transfer.

In at least one embodiment, when a preamble is received, the modem or a controller 604 and algorithm 606 may determine a threshold for detection. It may be difficult to determine the correct preamble threshold apriori; therefore, the controller 604 may measure the noise on the ASK signal before a new preamble is received, and the algorithm 606 may determine appropriate thresholds; those thresholds may then be set as system parameters 614. In at least one embodiment, the controller 604 may utilize predefined models within the system in a measurement mode to extract signal quality metrics, including $F_{CLK}$ fidelity and $V_{RECT}$ fidelity. For example, when modem data is not being transferred, logic within the modem, or the controller 604 via the modem, may monitor noise levels on a coil network, 608 and a corresponding noise type or signature. The algorithm 606 may use the noise level and type to set system parameters 614 (e.g., the preamble thresholds for detection, baud rate, or the like). For example, when determining an ASK preamble threshold, existing modem circuitry may be utilized as a signal quality calculator, or there may be a dedicated block to measure noise on the coil network 608.

In at least one embodiment, the controller 604 may receive signals to turn on and off measurement accumulation, reset integrated error values, dump an integrated error value after so much integration, and the like. The controller 604 may be separately controllable with respect to measurement of ASK fidelity. In at least one embodiment, the controller 604 may measure a down converted ASK signal, potentially via the ASK modem; such measurement may identify a magnitude per channel and accumulate measurements of those magnitudes. ASK signal and noise may be directly correlated with root mean square calculations of magnitude measurement. The root mean square values may be used to set an ASK preamble threshold.

Figure 7:
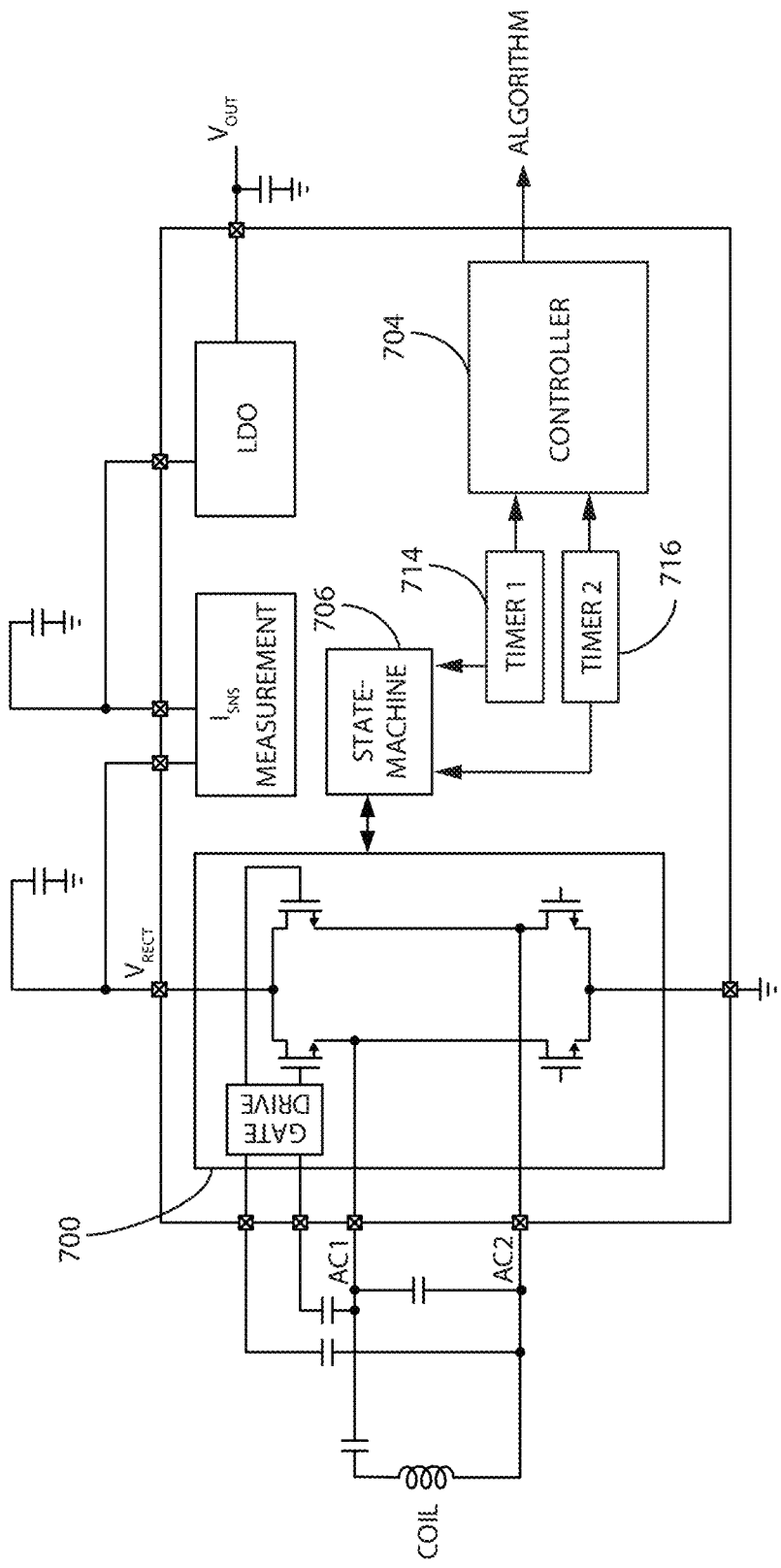
FIG. 7 shows a block diagram of a system according to an exemplary embodiment.

Referring to FIG. 7, a block diagram of a system according to an exemplary embodiment is shown. The system, such as a wireless power transfer system, may include a rectifier 700 with a plurality of FETs and corresponding drive circuitry or logic.

In at least one embodiment, where the rectifier 700 includes a state machine 706, one or more timers 714, 716 may control or inform turn-on events in the state machine 706. The timers 714, 716 may be configured for ½ period and/or full period turn-on events. Where an input carrier frequency is known, the timers 714, 716 may force the rectifier 700 to switch according to performance expectations. If the 50% duty cycle is known via measurements of signal quality metrics as described herein, and oscillations cause the turn-on periods and turn-off periods to shift, the timers 714, 716 may modify the state machine 706 to force desired turn-on and turn-off timing within a narrower range.

In at least one embodiment, one or more high frequency timers may measure the turn-on, turn-off timing in the rectifier 700 (e.g., when a carrier signal goes high as compared to when the carrier signal goes low). When rectifying the carrier signal, the rectifier 700 may use comparators that measure the duration of on and off periods. A controller 704 may determine a jitter for the $F_{CLK}$ based on those measurements. For example, the controller 704 (e.g., a PI controller) may perform a root-mean-square calculation, a deviation calculation, or some other process to approximate jitter; higher accumulated root-mean-square error values may indicate higher jitter.

Jitter may be a useful metric for FSK demodulation. The magnitude of jitter may be used to determine an appropriate modem type for front end filtering, modem configuration settings, a baud rate for FSK communication, and the like. In at least one embodiment, such front-end filtering and the baud rate may be determined via a function relating those settings to timer outputs (e.g., instantaneously, or integrated values over time). Alternatively, or in addition, the controller 704 may employ a trained machine learning algorithm. The controller 704 may then apply such settings to a modem or other data communication hardware.

Figure 8:
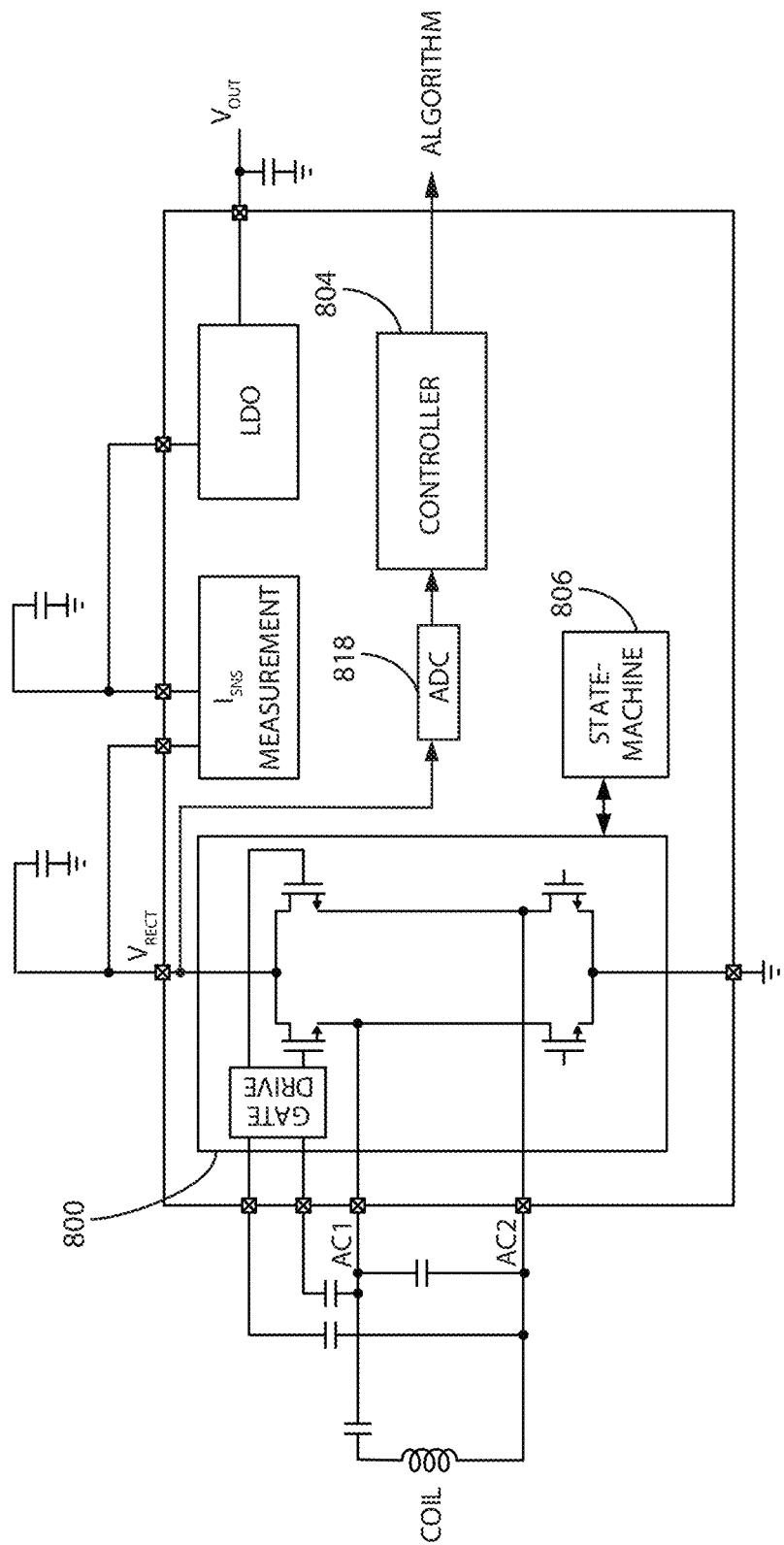
FIG. 8 shows a block diagram of a system according to an exemplary embodiment.

Referring to FIG. 8, a block diagram of a system according to an exemplary embodiment is shown. The system, such as a wireless power transfer system, may include a rectifier 800 with a plurality of FETs and corresponding drive circuitry or logic, and a state machine 806 may set and/or adjust features of the rectifier 800 (e.g., $I_{LIM}$) from time to time based on signal quality metrics to enhance rectifier stability.

In at least one embodiment, a controller 804 may determine a maximum baud rate for FSK based on noise. The controller 804 may utilize a closed loop algorithm to determine the maximum baud rate based on the mean and variance of turn-on and turn-off durations (e.g., the root-mean-square and/or deviation as described herein). Furthermore, the controller 804 may interact with the state machine 806 to adjust features of the rectifier that reduce noise as more fully described herein.

In at least one embodiment, a controller 804 may measure $V_{RECT}$ fidelity by passing a $V_{RECT}$ measurement though a filter such as a high-pass filter. High-frequency noise of $V_{RECT}$ measurements may be accumulated and the controller 804 may calculate the mean, root mean square, variance of $V_{RECT}$, and the like. Higher $V_{RECT}$ noise is correlated with higher root mean square error values. $V_{RECT}$ measurements may be converted to digital values via an analog-to-digital converter (ADC) 818 for digital integration by the controller 804. An ADC may be any system capable of converting an analog input signal into a digital signal. The ADC be, but is not limited to, a successive approximation (SAR) ADC, a delta-sigma ADC, a dual slope ADC, a pipelined ADC, or a flash ADC.

$V_{RECT}$ fidelity may be useful for determining rectifier stability. Stable rectifiers may produce a DC output with no or very low high-end frequency content. High-end frequency content may indicate the system is unstable (e.g., coil parameters or loading are causing instability) and/or some component has been programmed incorrectly.

Figure 9:
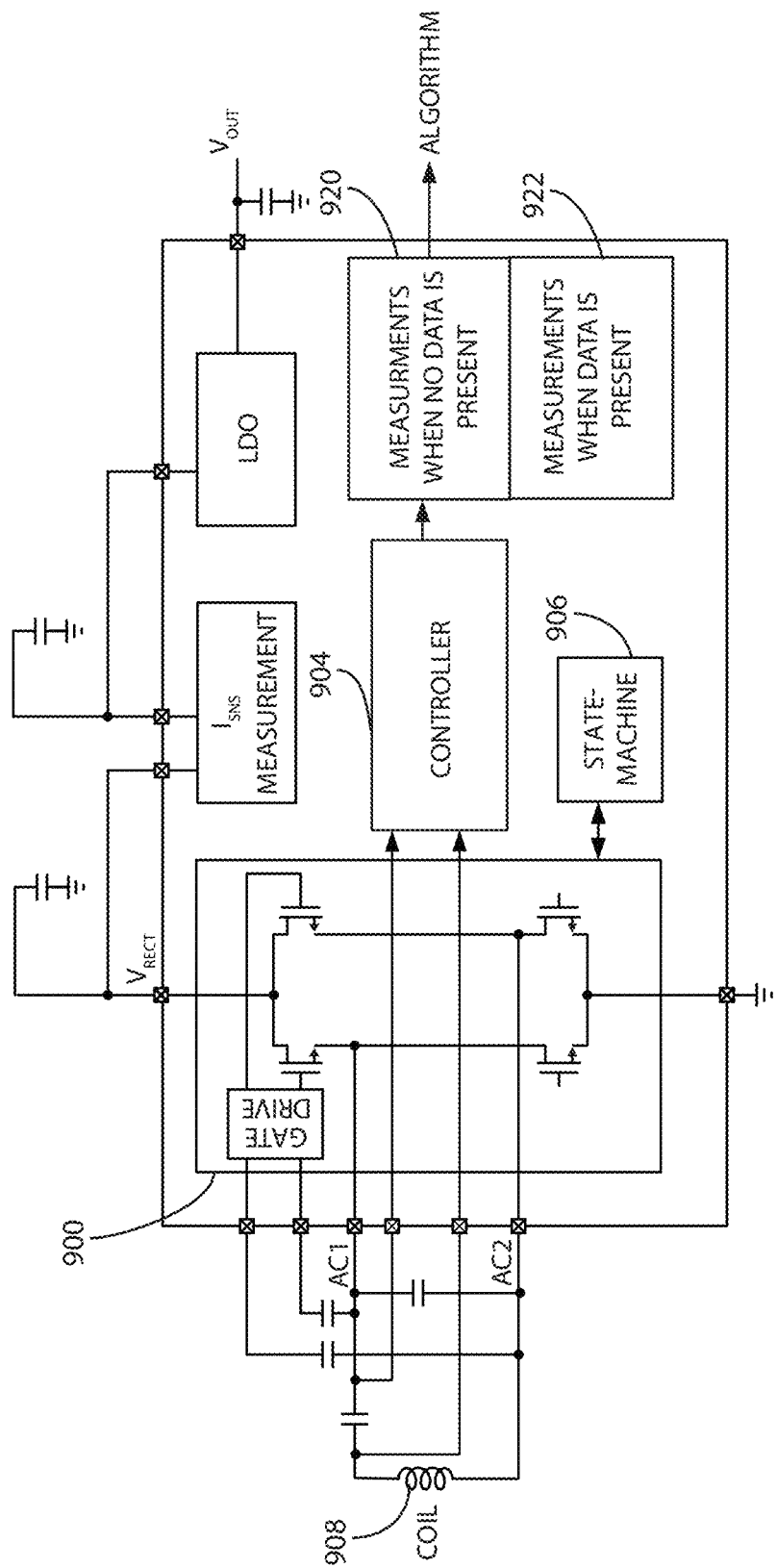
FIG. 9 shows a block diagram of a system according to an exemplary embodiment.

Referring to FIG. 9, a block diagram of a system according to an exemplary embodiment is shown. The system, such as a wireless power transfer system, may include a rectifier 900 with a plurality of FETs and corresponding drive circuitry or logic, and a state machine 906 may set and/or adjust features of the rectifier 900 from time to time based on signal quality metrics to enhance rectifier stability. A controller 904 may receive measurements from locations within the coil network 908 and record those measurements based on data transmission through the coil network 908. For example, when the carrier signal does not include any data, the controller 904 may compute 920 mean values and variances on the coil network 908 and/or an in-series capacitor voltage. When the carrier signal does include data, the controller 904 may compute 922 mean values and variances on decoder input (e.g., preambles and/or data packets).

In at least one embodiment, the controller 904 may include or implement filters such as high pass filters, ADCs, a slope detector to derive a slope or first derivative of the carrier signal or some filter component of the carrier signal, a downconverter, or the like.

Embodiments of the present disclosure enable real-time monitoring of $V_{RECT}$ with closed-loop control to improve rectifier signal quality and stability by measuring the rectifier output and controlling a dynamic buck or dynamic boost control signal to regulate the rectifier output voltage. Real-time monitoring and control enable a wider range of coil networks and slower rectifier comparators (e.g., less area and active power) as compared to existing systems.

It is believed that the inventive concepts disclosed herein and many of their attendant advantages will be understood by the foregoing description of embodiments of the inventive concepts, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The forms herein before described being merely explanatory embodiments thereof, it is the intention of the following claims to encompass and include such changes. Furthermore, any of the features disclosed in relation to any of the individual embodiments may be incorporated into any other embodiment.

What is claimed is:

1. A system comprising:
   a rectifier comprising:
      a plurality of field effect transistors (FETs); and
      a plurality of comparators, each configured to switch one or more of the FETs;
      a high pass filter configured to extract noise components of a $V_{RECT}$ signal; and
   at least one controller configured to:
      receive an oscillating signal ($F_{CLK}$);
      identify an event as being an occurrence of one of a predefined set of events;
      determining a fidelity of $F_{CLK}$ associated with the event;
      determine a gain value for the rectifier based on a slope of $F_{CLK}$;
      measure changes in $F_{CLK}$ over time;
      identify noise in $F_{CLK}$; and
      adjust a current threshold (ILIM) of at least one of the plurality of comparators based the identified noise and on the measured changes.

2. The system of claim 1, wherein the at least one controller is further configured to:
   determine a set of modem configuration settings for establishing a data connection based at least on the identified noise.

3. The system of claim 2, wherein the at least one controller is further configured to determine a frequency shift keying (FSK) front end filter based at least on the identified noise.

4. The system of claim 1, wherein:
   the at least one controller is further configured to identify an event as being an occurrence of one of a predefined set of events; and
   wherein measuring changes in FCLK over time begins in response to the identified event.

5. The system of claim 4, wherein:
   the event comprises receiving a signal to initiate a data communication; and
   the at least one controller is further configured to:
   identify noise in FCLK; and
   determine a baud rate for the data communication.

6. A rectifier comprising:
   a plurality of field effect transistors (FETs);
   a plurality of comparators, each configured to switch one or more of the FETs;
   a coil network;
   a high pass filter configured to extract noise components of a $V_{RECT}$ signal; and
   at least one controller configured to:
      receive signals from one or more locations within the coil network;
      determine a status of the received signals to include a request to initiate data communications;
      accumulate voltage values from the signals in response to a determination that the signal does not include a request to initiate data communication;
      accumulate decoder inputs from the signals in response to a determination that the signal includes a request to initiate data communication;
      identify noise in $F_{CLK}$;
      identify an event as being an occurrence of one of a predefined set of events;
      determining a fidelity of $F_{CLK}$ associated with the event;
      determine a gain value for the rectifier based on a slope of $F_{CLK}$; and
      determine one or more data communication settings based on the identified noise and the accumulated decoder inputs.

7. The rectifier of claim 6, wherein the at least one controller is further configured to:
   measure changes in an oscillating signal (FCLK) over time based at least on the accumulated voltage values; and adjust a current threshold (ILIM) of at least one of the plurality of comparators based at least on the measured changes.

8. The rectifier of claim 7, wherein the at least one controller is further configured to adjust a rectifier gain based at least on the measured changes.

9. The rectifier of claim 6, wherein the at least one controller is further configured to:
measure oscillations in a rectified voltage (VRECT);
adjust a current threshold (ILIM) of at least one of the plurality of comparators based at least on the measured oscillations.

10. The rectifier of claim 9, wherein the at least one controller is further configured to adjust a rectifier gain based at least on the measured oscillations.

11. The rectifier of claim 9, further comprising a filter configured to receive VRECT and produce a signal including the oscillations, wherein the at least one controller is further configured to apply the filtered signal to a rectifier input.

12. A wireless power transfer system comprising:
a rectifier configured to produce a rectified voltage ($V_{RECT}$), the rectifier comprising a plurality of field effect transistors (FETs) and a plurality of comparators, each comparator configured to switch one or more of the FETs;
a high pass filter configured to extract noise components of the $V_{RECT}$ signal;
at least one controller configured to:
measure oscillations in $V_{RECT}$;
identify noise in $V_{RECT}$; and
identify an event as being an occurrence of one of a predefined set of events;
determining a fidelity of $F_{CLK}$ associated with the event;
determine a gain value for the rectifier based on a slope of $F_{CLK}$;
adjust a current threshold (ILIM) of at least one of the plurality of comparators based on the identified noise and the measured oscillations.

13. The wireless power transfer system of claim 12, further comprising a filter configured to receive VRECT and produce a signal including the oscillations.

14. The wireless power transfer system of claim 13, wherein the at least one controller is further configured to apply the filtered signal to a rectifier input.

15. The wireless power transfer system of claim 12, wherein the at least one controller is further configured to:
determine a slope of the oscillations; and
determine a boost value for the rectifier based at least on the slope.

16. The wireless power transfer system of claim 12, wherein the at least one controller is further configured to adjust a gain of the rectifier based at least on the oscillations.

17. The wireless power transfer system of claim 12, wherein the at least one controller is further configured identify a baud rate for data communications based at least on the oscillations.

* * * * *